(12) United States Patent
Ito et al.

(10) Patent No.: US 6,977,901 B2
(45) Date of Patent: Dec. 20, 2005

(54) PACKET TRANSMISSION/RECEPTION PROCESSOR

(75) Inventors: Hirotaka Ito, Osaka (JP); Yoshihiro Tabira, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 930 days.

(21) Appl. No.: 09/838,181

(22) Filed: Apr. 20, 2001

(65) Prior Publication Data

US 2001/0034799 A1 Oct. 25, 2001

(30) Foreign Application Priority Data

Apr. 25, 2000 (JP) .............................. 2000-124867

(51) Int. Cl.[7] .......................... H04L 12/28; H04L 12/56; G06F 15/16
(52) U.S. Cl. ....................... 370/242; 370/389; 370/412; 709/250
(58) Field of Search ............................... 370/242–182, 370/252, 216, 282, 342–395, 411–474; 709/220–250; 711/170–173; 710/5–33, 105

(56) References Cited

U.S. PATENT DOCUMENTS

| | | | | |
|---|---|---|---|---|
| 5,031,175 | A * | 7/1991 | Tanaka et al. ............... | 370/216 |
| 6,023,475 | A * | 2/2000 | Tanaka et al. ............... | 370/471 |
| 6,205,494 | B1 * | 3/2001 | Williams ....................... | 710/5 |
| 6,408,012 | B1 * | 6/2002 | Sato ............................. | 370/545 |
| 6,457,079 | B1 * | 9/2002 | Hanaoka et al. ............. | 710/105 |
| 6,580,711 | B1 * | 6/2003 | Muto ........................... | 370/389 |
| 6,654,380 | B1 * | 11/2003 | Yumiba et al. .............. | 370/412 |
| 6,690,648 | B2 * | 2/2004 | Niida et al. .................. | 370/236 |
| 6,693,905 | B1 * | 2/2004 | Ishimura et al. ............. | 370/389 |
| 6,754,222 | B1 * | 6/2004 | Joung et al. .................. | 370/412 |
| 6,763,030 | B1 * | 7/2004 | Regev et al. ................. | 370/419 |
| 6,804,250 | B2 * | 10/2004 | Hatae et al. .................. | 370/419 |
| 2001/0017860 | A1 * | 8/2001 | Hata ........................... | 370/395 |
| 2003/0172201 | A1 * | 9/2003 | Hatae et al. ................... | 710/8 |
| 2003/0179719 | A1 * | 9/2003 | Kobayashi et al. ........... | 370/282 |
| 2005/0163120 | A1 * | 7/2005 | Tachibana .................... | 370/389 |

FOREIGN PATENT DOCUMENTS

| | | |
|---|---|---|
| JP | 11-17743 | 1/1999 |
| JP | 11-177774 | 7/1999 |
| JP | 11-261621 | 9/1999 |

* cited by examiner

*Primary Examiner*—Man U. Phan
(74) *Attorney, Agent, or Firm*—McDermott Will & Emery LLP

(57) ABSTRACT

If a packet processing controller at a consumer node has failed to process a received packet within a predetermined amount of time, a packet processing control timer detects a time-out and informs a CPU of that. In response, the CPU issues packet processing suspend instruction and packet transmit instruction for the controller by way of a register. In accordance with these instructions, the controller suspends the current packet processing and produces header and data for a WRS packet, which is transmitted to a producer node through a bus. In this manner, a packet can be processed without causing a time-out at the producer node.

14 Claims, 10 Drawing Sheets

Block write request transmit format

Quadlet write request transmit format

Write response receive format

Block read request transmit format

Block read response receive format

Write request for data block packet format

Write request for data quadlet packet format

Write response packet format

Read request for data block packet format

Read response for data block packet format

PACKET TRANSMISSION/RECEPTION PROCESSOR

BACKGROUND OF THE INVENTION

The present invention generally relates to a packet transmission/reception processor, and more particularly relates to a technique of exchanging packetized data using an IEEE 1394 digital interface.

Generally speaking, digital data is usually transmitted or received on a packet-by-packet basis. An IEEE 1394 interface is a typical one of various digital interfaces that exchange packetized data. As used herein, an "IEEE 1394 interface" means a next-generation high-speed serial interface, which is now being standardized by the Institute of Electrical and Electronic Engineers, Inc. (IEEE).

An IEEE 1394 interface can cope with two types of packet exchange, namely, isochronous and asynchronous packet exchange methods. The isochronous packet exchange is utilized to transfer data from an audiovisual appliance (e.g., digital video camera), from which real-time transmission is demanded strongly. On the other hand, the asynchronous packet exchange is utilized to transfer data from personal computer or external storage like hard disk drive. In that case, the data does not always have to be transferred in real time but must be highly accurate and reliable.

IEEE 1394-compliant asynchronous packets include a "request packet" representing an action to be performed and a "response packet" returning a result of an action performed responsive to a request packet. No matter whether a recipient has received request packet or response packet, the recipient always returns an acknowledge (ack) packet, which represents the reception state of the packet, to its sender. Unless the reception of an ack packet, returned in response to a request packet, completes processing, request and response packets are usually used in pairs. A packet exchange sequence using request and response packets is called a "transaction".

Hereinafter, it will be described with reference to FIG. 14 how an asynchronous transaction is carried out sequentially where Initiator sends out a request packet to Responder.

First, Initiator sends out a request packet to Responder B. On receiving the request packet, Responder returns an ack packet to Initiator. The ack packet returned may represent that the request packet should be sent again (ack_busy), that the request packet has been received safely but is now being processed (ack_pending) or that the action requested is complete (ack_complete). In the illustrated example, Responder returns an ack_busy packet to Initiator as shown in FIG. 14.

Responsive to the ack_busy packet, Initiator re-transmits the same request packet to Responder again. On receiving the request packet, Responder returns an ack-pending packet to Initiator this time.

As described above, the ack_pending packet represents that Responder has received the request packet safely but is now processing it. Accordingly, receiving this ack_pending packet, Initiator waits for Responder to return a response packet associated with the request packet.

The IEEE 1394 standard defines a time-out so that an action aborted, if any, can be detected during a transaction performed using request and response packets. Specifically, if an initiator receives no response packet even after a predetermined amount of time has passed since the initiator received an ack_pending packet responding to a request packet, then it is determined that the action requested was aborted due to some abnormality. Then, the initiator that sent the request packet can start the next transaction.

Stated otherwise, the responder that received the request packet should return an associated response packet within the predetermined amount of time. An initial value of the predetermined time is set to 100 ms, but is arbitrarily changeable at each end. On the other hand, if the responder has returned an ack_complete packet, then the initiator may start the next transaction immediately and does not have to return any response packet.

An "asynchronous connection" is known as one of the IEEE 1394 protocols utilizing the asynchronous packet exchange technique. The asynchronous connection is a transfer protocol defined for packet exchange between a "producer node" sending out a request packet and a "consumer node" returning a response packet. The asynchronous connection protocol is implementable by a system such as that shown in FIG. 15, for example. In the system shown in FIG. 15, a controller (e.g., set top box) issues a command for a consumer node (e.g., printer), thereby connecting the consumer node and a producer node (e.g., digital video camera) together. The connection protocol thereof is as follows.

(1) First, the controller performs a resource allocation on a plug control register (PCR) of the consumer node. In response, the consumer node returns an assigned plug address to the controller.

(2) Next, the controller supplies the plug address at the consumer node to the producer node, thereby initializing the producer node. In response, the producer node also returns its plug address to the controller.

(3) Then, the controller sends the plug address at the producer node to the consumer node to complete the connection.

When the connection is completed, the consumer node secures a memory region (which will be herein called a "segment buffer region") for storing the data transmitted from the producer node and issues a lock request (LRQ) packet to the producer node as shown in FIG. 16. In response, the producer node returns a lock response (LRS) packet to the consumer node as indicated by (a).

Then, the producer node sends data, which has been stored in a memory region with consecutive addresses as defined by the application on the transmitting end (which will also be called a "segment buffer region" herein), to the consumer node in the form of a block write request (BWRQ) packet. The IEEE 1394 standard defines the maximum size of a data field included in a packet that can be transmitted at a time. Accordingly, if the size of the data in the segment buffer region is greater than the maximum size, then the data is divided into multiple sections and then those divided sections are transmitted one by one. On receiving the BWRQ packet, the consumer node returns an ack_pending packet to the producer node. Next, the consumer node reads the address of the data included in the received packet and then stores the received data in the segment buffer region defined by the application on the receiving end. After the consumer node has entirely stored the data field of the received packet in the segment buffer region, the consumer node returns a write response (WRS) packet to the producer node as indicated by (b). On receiving the response packet, the producer node sends an ack_complete packet to the consumer node as indicated by (c). Transactions like this will be carried on until the data, stored in the segment buffer region defined by the application on the transmitting end, has been transmitted completely. These transactions are collectively called "data transfer processing".

When the producer node has transferred all the data from the application on the transmitting end to the application on the receiving end (i.e., at the consumer node), the producer node sends a lock request (LRQ) packet, representing that the transfer is complete, to the consumer node. In response, the consumer node returns a lock response (LRS) packet to the producer node as indicated by (d). In this case, the segment buffer regions as defined by the applications on the transmitting and receiving ends have the same top address and the same size. Also, the producer node sequentially sends the data stored in the segment buffer region and the consumer node also sequentially stores the data, included in the received packets, in the segment buffer region defined by the application on the receiving end.

Moreover, the asynchronous connection protocol requires that if the producer node fails to transmit the next request packet within 2 seconds after having received a response packet from the consumer node during data transfer, the producer node must send a request packet, indicating that state, to the consumer node as in (C) in FIG. 17. A processing step like this will be herein called "heartbeat processing".

Furthermore, unless the consumer node receives the next request packet or a packet indicating the heartbeat processing within 5 seconds after having sent the response packet, the consumer node must enter the time-out processing.

FIG. 18 illustrates a circuit performing such processing.

As shown in FIG. 18, one end of an IEEE 1394 serial bus 12a is connected to a physical layer controller 13, while the other end thereof is connected to another system (or node). A register 31 is coupled to a CPU by way of another bus 12g. The physical layer controller 13 performs various functions including initializing the bus 12a, arbitration and controlling a bias voltage. A link core circuit 14 receives a packet, transferred through the bus 12a, by way of the physical layer controller 13. Also, the link core circuit 14 generates or detects an error correction code for/from the packet received, adds a sign bit to the packet or detects the code (e.g., an ack packet code), for example. Moreover, the link core circuit 14 outputs a packet, which has been supplied from a transmission buffer 36, onto the bus 12a via the physical layer controller 13. Furthermore, the link core circuit 14 has a retry function. That is to say, even if the link core circuit 14 once failed to transfer a packet, the circuit 14 can try transferring the same packet again.

When the CPU writes header information on the register 31, data to be transmitted is sent to a packet transmitter 35. In response, the packet transmitter 35 makes a packet, which is then stored on the transmission buffer 36. In making the packet, the packet transmitter 35 provides the information about the packet to be transmitted for a reception controller 34. When the packet supplied from the packet transmitter 35 is written on the transmission buffer 36, the transmission buffer 36 passes the packet to the link core circuit 14. And then the link core circuit 14 transmits the packet by way of the physical layer controller 13.

On the other hand, the reception controller 34 receives a packet from the link core circuit 14 and analyzes the contents of the header field included in the packet. Also, to accurately identify the received packet (or to see if this is the packet that should be received in response to the packet transmitted), the reception controller 34 obtains information about the transmitted packet from the packet transmitter 35. Then, the reception controller 34 analyzes the information by comparing it to the header information of the received packet. Based on a result of the analysis, the reception controller 34 determines whether or not the packet should be accepted. And the reception controller 34 controls and instructs the link core circuit 14 not to accept the received packet if the packet is not paired with the transmitted packet.

The packet receiver 33 passes the received packet from the reception controller 34 to a packet reception buffer 32 so that the packet is stored on the buffer 32. And the CPU can read out the packet, stored on the packet reception buffer 32, by way of the register 31.

As described above, the IEEE 1394 defines a time-out to detect an action aborted during a transaction performed using request and response packets.

On the other hand, in the asynchronous connection protocol, if the data, included in the received packet, cannot be stored successfully in the segment buffer region at the consumer node within an amount of time defined by the IEEE 1394, then the consumer node cannot return a response packet in response to a request packet. Accordingly, a time-out is produced at the producer node.

However, the asynchronous connection protocol does not define how the processing should end at the producer node in case of time-out. Accordingly, a system complying with the protocol could not be established. Furthermore, since the producer node has already received an ack_pending packet, representing that the packet has been received safely, the time-out starts the next transaction while the current transaction is still incomplete. As a result, multiple transactions should be handled in parallel and multiple received packets should be processed at a time, thus making it much more complicated to establish a desired system.

Also, the asynchronous connection protocol demands that if the producer node cannot transmit the next request packet within 2 seconds after having received a response packet from the consumer node, the producer node must perform heartbeat processing to indicate the state. On the other hand, unless the consumer node receives the next request packet or the packet indicating the heartbeat processing within 5 seconds after having sent the response packet, the consumer node must enter the time-out processing. Thus, the asynchronous connection protocol requires a time management method different from the method applicable to data exchange using request and response packets in accordance with the IEEE 1394.

Furthermore, to transmit or receive a packet indicating the heartbeat processing at an arbitrary time, the producer node should perform time management in determining when the making and transmission of packets should be restarted, carried out or stopped. The consumer node should also perform time management to determine when the processing of received packets should be restarted, carried out or stopped.

Accordingly, the asynchronous connection protocol demands a packet transmission/reception processor that can transmit and receive packets while executing all of these functions.

SUMMARY OF THE INVENTION

A packet transmission/reception processor according to an aspect of the present invention is coupled to a CPU and includes a link core circuit and a packet processing controller. The link core circuit receives a packet delivered externally through a bus and also sends out a packet to be transmitted, supplied from the controller, by way of the bus. The controller processes the packet received by the link core circuit, makes the packet to be transmitted in response to the received packet, and then supplies the packet to be transmitted to the link core circuit.

In the inventive processor, the CPU has nothing to do with transaction processing. Accordingly, when transactions is processed at the consumer node, the load on the CPU can be lightened, thus speeding up the processing.

In one embodiment of the present invention, the inventive processor preferably further includes a packet processing control timer. The timer clocks how much time has passed since a packet was received by the link core circuit and generates a signal when the time passed reaches a predetermined amount of time. Responsive to the signal supplied from the timer, the controller stops processing the received packet, makes another packet to be transmitted in response to the received packet and then restarts processing the received packet.

In such an embodiment, the transmitting end can carry on the transaction without causing time-out for the transmitting end.

In another embodiment of the present invention, while processing the received packet, the controller preferably prohibits the link core circuit from receiving another packet delivered externally through the bus.

The processor of this embodiment does not accept the next request packet until the current transaction is over. Accordingly, the transaction processing and the sequence can be both simplified.

In still another embodiment, the inventive processor preferably further includes a packet filter circuit. In accordance with identification information included in each of the packets received by the link core circuit, the filter circuit determines whether or not each said received packet should be processed and supplies only the received packets to be processed to the controller.

More specifically, in accordance with the identification information of each said received packet and based on a result of the processing that the controller has performed on the received packet, the filter circuit predicts header information of a packet that the link core circuit should receive next time. Then, the filter circuit compares the predicted header information to that of a next packet that the link core circuit has actually received. Based on a result of the comparison, the filter circuit determines whether or not the next packet received by the link core circuit should be stored and then supplies only the packets to be stored to the controller.

The processor of this embodiment can ensure continuity for received packets or received data needed and can make and send out appropriate packets to be transmitted in response to the received packets. Accordingly, multiple transactions required can be processed concurrently.

In yet another embodiment, the controller preferably includes transaction control circuit, packet engine circuit, header control circuit, data field control circuit and data processing circuit. The transaction control circuit controls a series of transactions, each starting with packet transmission and ending with packet reception or vice versa. The packet engine circuit automatically divides a packet and controls all the transactions. The header control circuit makes a packet that includes a header with packet identification information but no data field and controls transmission of the packet. The data field control circuit makes a packet that includes not only a header with packet identification information but also a data field and controls transmission of the packet. And the data processing circuit processes and controls the data field of the received packet.

The processor of this embodiment can efficiently perform a transaction including packet reception, received packet processing and packet transmission and another transaction including packet transmission, packet reception and received packet processing.

In this particular embodiment, the transaction control circuit preferably manages a time it takes to transmit a packet after the controller started to make the packet or to finish processing a received packet after the controller received the packet and outputs a result of the time management to the CPU. The transaction control circuit also manages a time it takes for the CPU to transmit a packet after the CPU started to make the packet or to finish processing a received packet after the CPU received the packet.

In such an embodiment, while a packet to be transmitted is being made or while a received packet is being processed, the packet processing can be carried out at any arbitrary time like that defined by the heartbeat processing.

A packet transmission/reception processor according to another aspect of the present invention is coupled to a CPU and includes a packet processing controller and a link core circuit. The controller makes a packet to be transmitted. Also, the controller processes a packet received by the link core circuit and then makes a packet to be transmitted in response to the received packet and supplies the packet to be transmitted to the link core circuit. The link core circuit sends out the packet to be transmitted, made by the controller, to an external unit by way of a bus and receives a packet delivered externally through the bus.

In the inventive processor, the CPU has nothing to do with transaction processing at the producer node. Accordingly, the load on the CPU can be lightened, thus speeding up the processing.

In one embodiment of the present invention, the inventive processor further includes a packet filter circuit. In accordance with identification information of the packet to be transmitted that has been supplied from the controller, the filter circuit determines whether or not each said packet received by the link core circuit should be processed. And the filter circuit supplies only the received packets to be processed to the controller.

The processor of this embodiment can ensure continuity for received packets and received data required and can also make and send out appropriate packets to be transmitted in response to the received packets. Accordingly, multiple transactions required can be processed concurrently.

A packet transmission/reception processor according to still another aspect of the present invention is coupled to a CPU and includes a link core circuit and a packet processing controller. The link core circuit receives a packet delivered externally through a bus and also transmits a packet, supplied from the controller, by way of the bus. The controller makes and supplies a request packet to the link core circuit. The controller also processes the packet received by the link core circuit and makes and supplies a next request packet consecutively to the link core circuit until a predetermined portion of the former request packet has been transferred.

The inventive processor is applicable to both the producer and consumer nodes alike, and realizes various functions required for these nodes by using a single chip. Accordingly, the inventive processor is implementable at a reduced circuit size.

DESCRIPTION OF THE PREFERRED EMBODIMENTS

Figure 1:
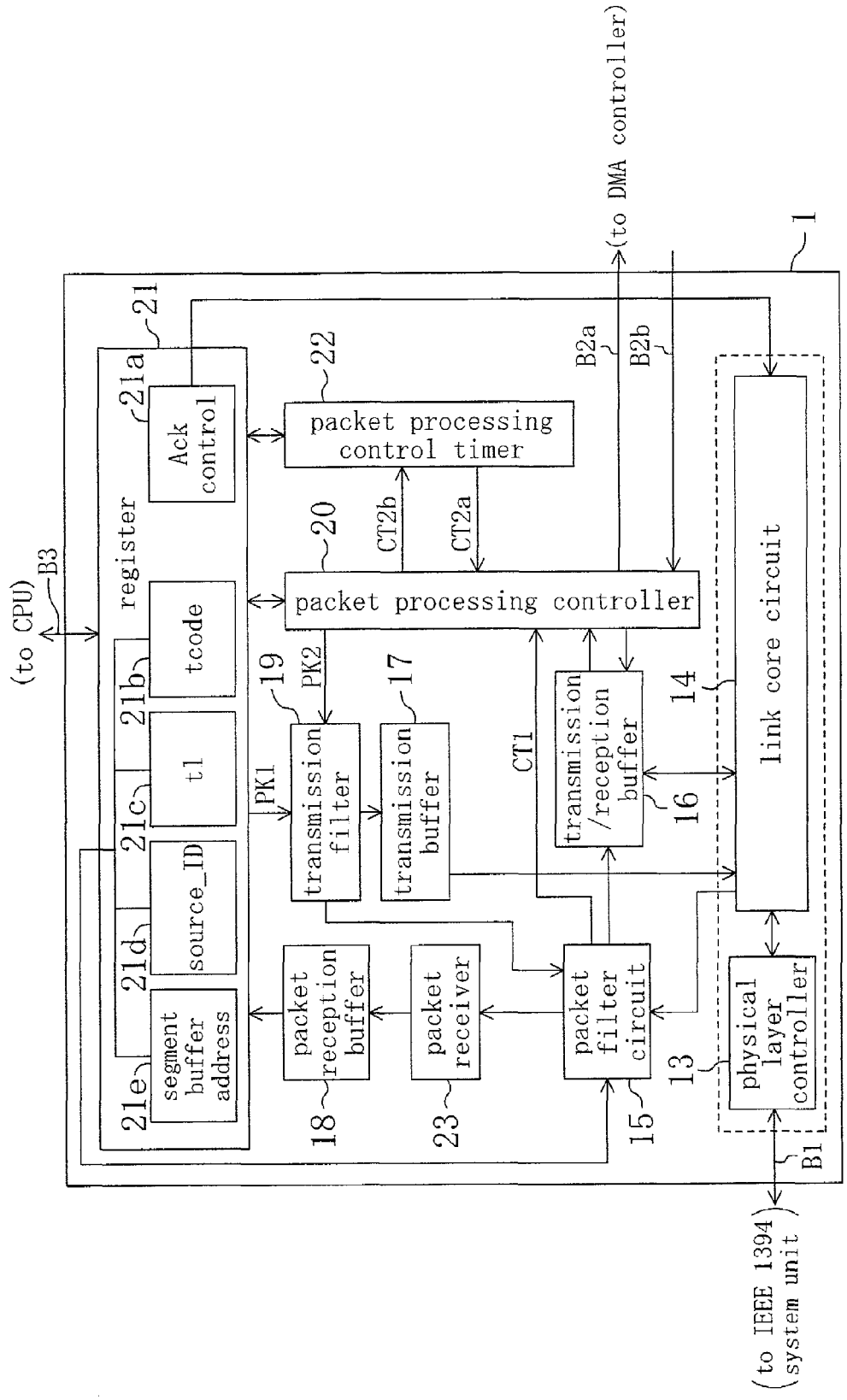
FIG. 1 is a block diagram illustrating an overall configuration for a packet transmission/reception processor according to an embodiment of the present invention.

Hereinafter, embodiments of the present invention will be described with reference to the accompanying drawings, in which each component with the same or like function will be identified by the same reference numeral for the sake of simplicity of description.

Packet Transmission/Reception Processor

FIG. 1 is a block diagram illustrating a configuration for a packet transmission/reception processor 1 according to an embodiment of the present invention. As shown in FIG. 1, the processor 1 is coupled to another IEEE 1394 system unit (not shown) by way of a bus B1, which may be an IEEE 1394 serial bus. The processor 1 is also coupled to a CPU (not shown, either) through a bus B3 and to a DMA controller (not shown, either) via DMA buses B2a and B2b.

The processor 1 includes physical layer controller 13, link core circuit 14, packet filter circuit 15, transmission/reception buffer 16, transmission buffer 17, packet reception buffer 18, transmission filter 19, packet processing controller 20, register 21, packet processing control timer 22 and packet receiver 23.

The physical layer controller 13 performs various functions including initializing the bus B1, arbitration and controlling a bias voltage. The link core circuit 14 receives a packet, transferred through the bus B1, by way of the physical layer controller 13. Also, the link core circuit 14 generates or detects an error correction code for/from the packet received, adds a sign bit to the packet or detects the code (e.g., an ack packet code), for example. Moreover, the link core circuit 14 outputs a packet onto the bus B1 by way of the physical layer controller 13. Furthermore, the link core circuit 14 has a retry function. That is to say, even if the link core circuit 14 failed to transfer a packet, the circuit 14 can try transferring the same packet again.

The packet filter circuit 15 receives a packet from the link core circuit 14 and analyzes the contents of the header field of the packet. And based on a result of the analysis, the filter circuit 15 selects either the packet reception buffer 18 or the transmission/reception buffer 16 as the destination where the packet should be stored. Also, in accordance with the analysis result, the filter circuit 15 outputs a control signal CT1 to the packet processing controller 20.

The packet receiver 23 passes the received packets selected from the filter circuit 15 to the packet reception buffer 18. Specifically, packets that have nothing to do with protocol processing are stored on the packet reception buffer 18. The CPU can read out the packets stored on the packet reception buffer 18 by way of the register 21 and bus B3.

Responsive to the control signal CT1 supplied from the filter circuit 15, the packet processing controller 20 processes the received packet. The received packet processing includes: making and transmitting a response packet in response to the received packet (the data of which will be sent to the DMA controller through the bus B2a); and controlling the transactions. Where the processor 1 acts as a producer node that transmits request packets, the controller 20 divides the data, which has been read out by the DMA controller and supplied through the bus B2b, into multiple packets. Then, the controller 20 outputs the packets to the link core circuit 14 by way of the transmission/reception buffer 16. In response, the link core circuit 14 outputs the packets onto the bus B1.

The transmission filter 19 selects either a packet PK1 supplied from the register 21 or a packet PK2 supplied from the controller 20 and stores the packet selected on the transmission buffer 17. The packet stored on the transmission buffer 17 is then passed to the link core circuit 14, which outputs the packet onto the bus B1.

As shown in FIG. 1, Ack control variable 21a, tcode variable 21b, t1 variable 21c, source_ID variable 21d, segment buffer address variable 21e and so on are stored on the register 21.

The tcode variable 21b is a code for use to identify the type of a received packet. Examples of the packet types include QRRQ (quadlet read request), BRRQ (block read request), BWRQ (block write request) and WRS (write response). The t1 variable 21c is a code for use to identify the type of a given transaction. The values of the tcode and t1 variables 21b and 21c are updated in the register 21 in accordance with the type of the packet to be stored. The source_ID variable 21d is a code representing the node number of the producer node. The segment buffer address variable 21e represents the current address in a segment buffer region at the consumer node. That is to say, the segment buffer address variable 21e represents an expected destination_offset address value that should be included in the received packet. When all the data has been stored at the segment buffer address at the consumer node, the segment buffer address variable 21e is updated in the register 21.

In response to a control signal CT2b supplied from the controller 20, the timer 22 starts clocking. And when the time passed reaches a predetermined amount, the timer 22 outputs a control signal CT2a to the controller 20. More specifically, where the processor 1 is a producer node that transmits request packets, the timer 22 clocks how much time has passed since the controller 20 started to make a BWRQ packet. And when the time passed reaches a preset amount, the timer 22 informs the CPU of that by way of the register 21. In response, the CPU issues an instruction to the timer 22. In accordance with this instruction, the timer 22 outputs the control signal CT2a to the controller 20. On the other hand, where the processor 1 is a consumer node that receives request packets, the timer 22 clocks how much time it takes for the processor 1 to finish receiving a packet after having started to receive it and also clocks the interval between the end of a transaction and the start of the next transaction.

Figure 2:
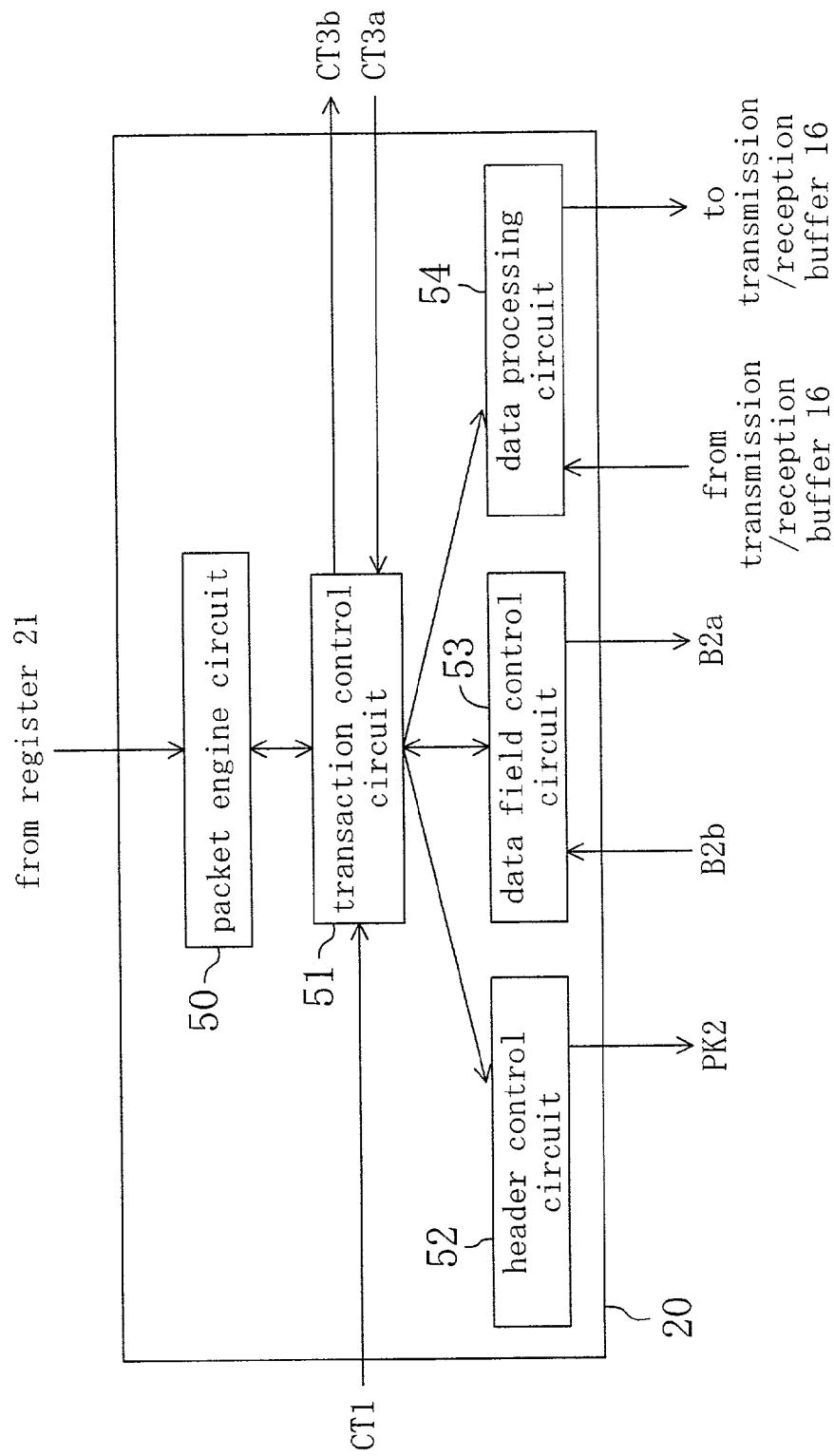
FIG. 2 is block diagram illustrating a configuration for the packet processing controller shown in FIG. 1.
Figure 3:
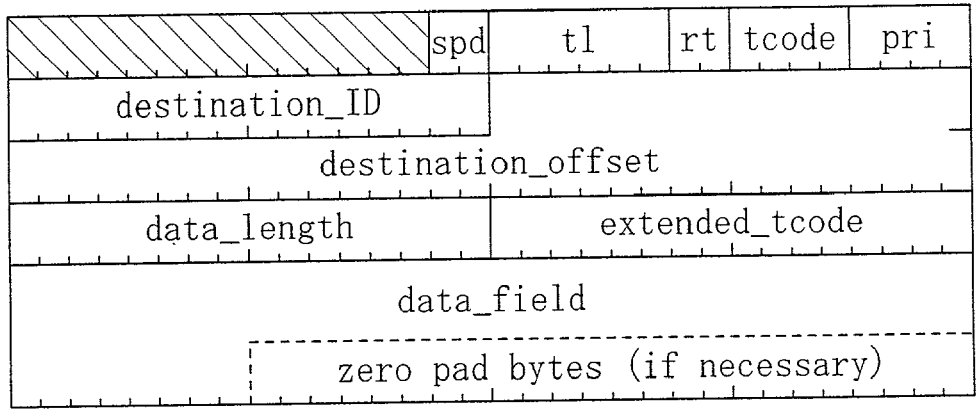
FIG. 3 illustrates a format for a block write request (BWRQ) packet output from the link core circuit shown in FIG. 1 onto the bus.
Figure 4:
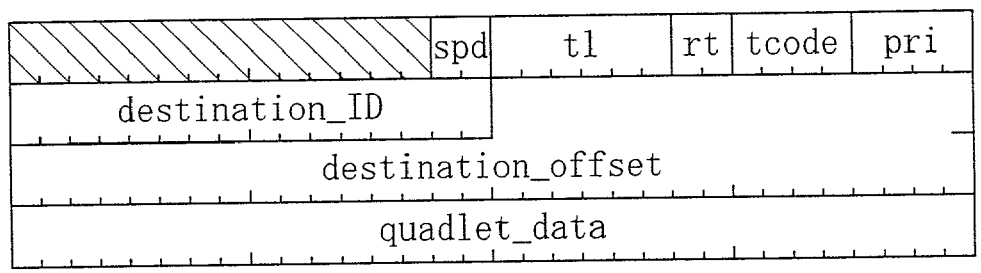
FIG. 4 illustrates a format for a quadlet write request (QWRQ) packet output from the link core circuit shown in FIG. 1 onto the bus.
Figure 5:
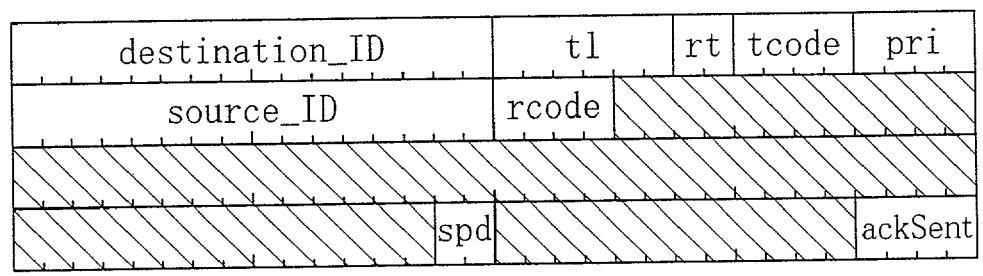
FIG. 5 illustrates a format for a write response (WRS) packet output from the link core circuit shown in FIG. 1 onto the bus.
Figure 6:
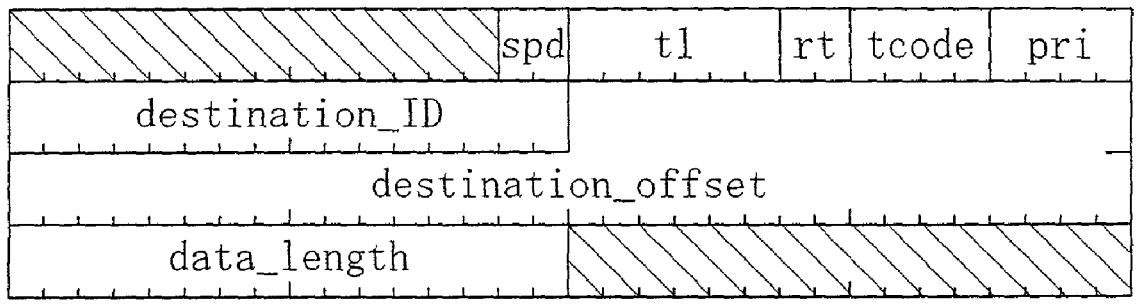
FIG. 6 illustrates a format for a block read request (BRRQ) packet output from the link core circuit shown in FIG. 1 onto the bus.
Figure 7:
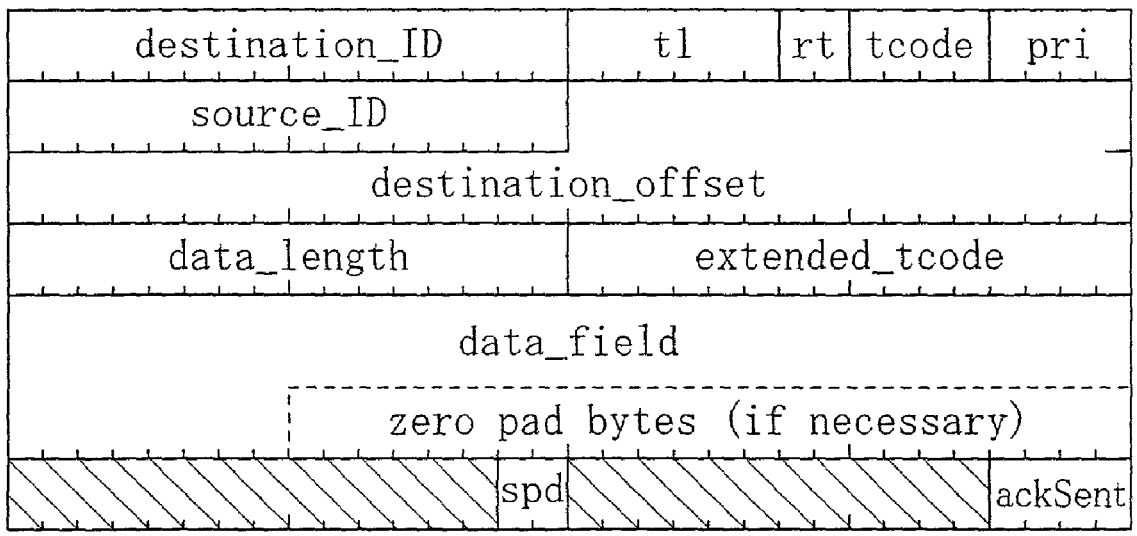
FIG. 7 illustrates a format for a block read response (BRRS) packet output from the link core circuit shown in FIG. 1 onto the bus.
Figure 8:
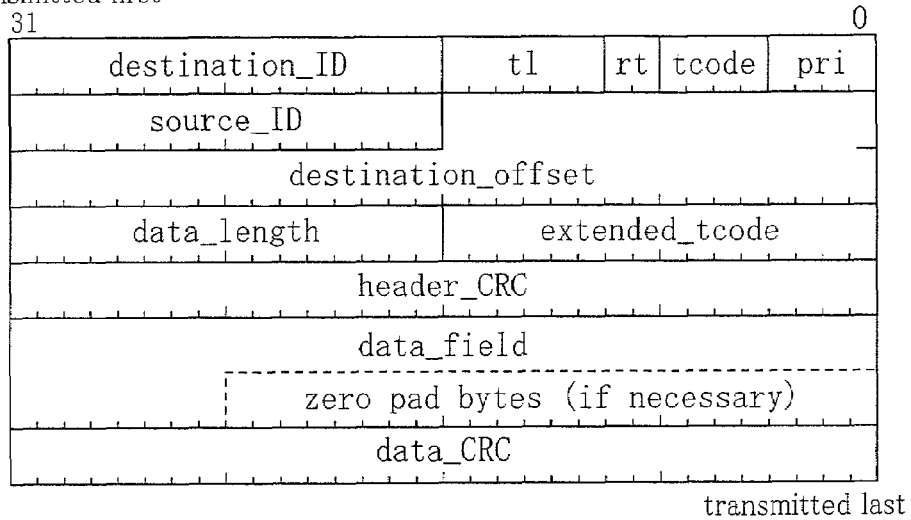
FIG. 8 illustrates a format for a BWRQ packet to be written on the link core circuit shown in FIG. 1.
Figure 9:
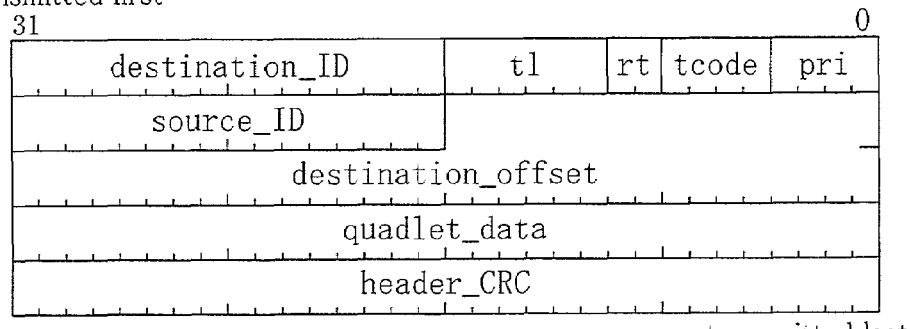
FIG. 9 illustrates a format for a QWRQ packet to be written on the link core circuit shown in FIG. 1.
Figure 10:
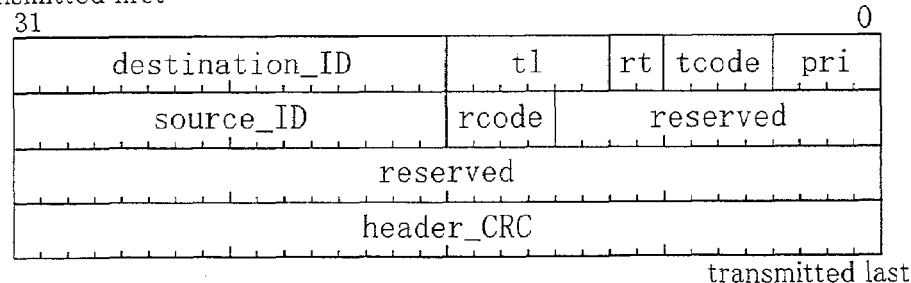
FIG. 10 illustrates a format for a WRS packet to be written on the link core circuit shown in FIG. 1.
Figure 11:
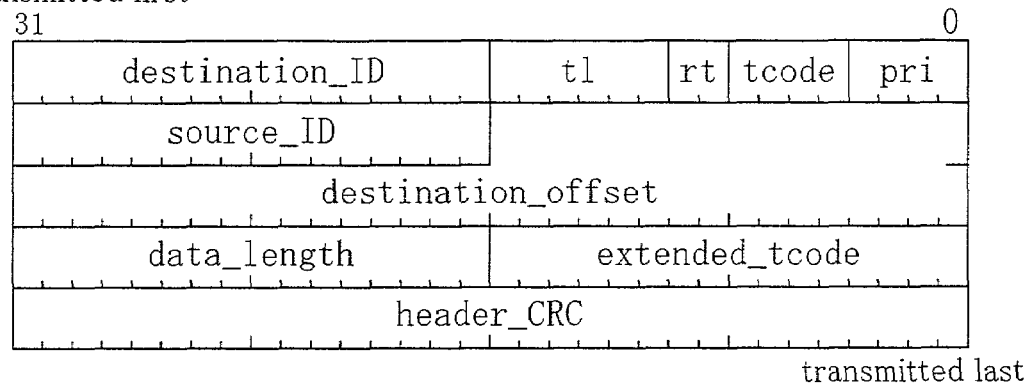
FIG. 11 illustrates a format for a BRRQ packet to be written on the link core circuit shown in FIG. 1.
Figure 12:
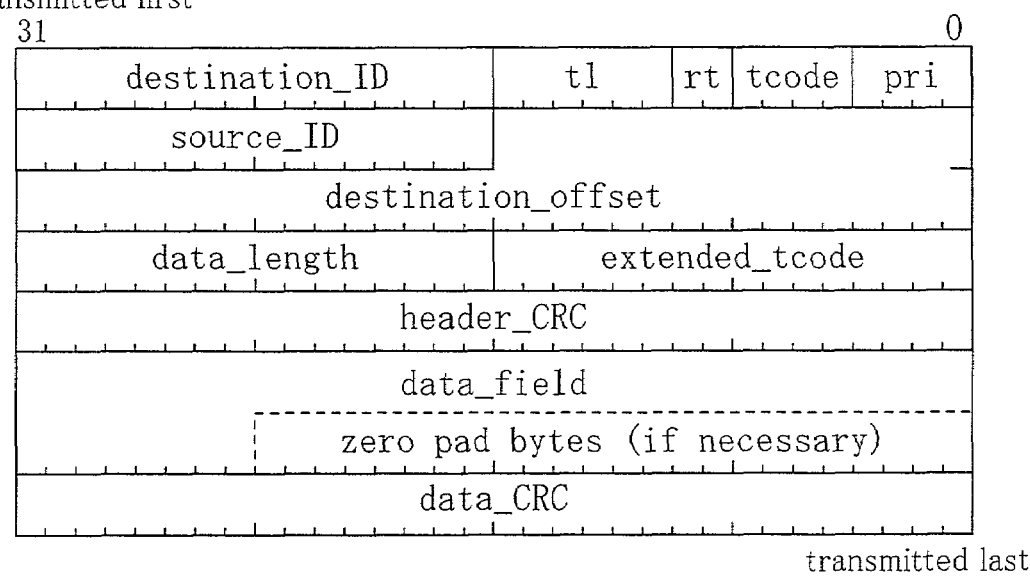
FIG. 12 illustrates a format for a BRRS packet to be written on the link core circuit shown in FIG. 1.

FIG. 2 is block diagram illustrating an internal configuration for the packet processing controller 20 shown in FIG. 1. As shown in FIG. 2, the controller 20 includes packet engine circuit 50, transaction control circuit 51, header control circuit 52, data field control circuit 53 and data processing circuit 54.

The packet engine circuit 50 automatically divides a packet and controls all the transactions. The transaction control circuit 51 controls a series of transactions, each starting with packet transmission and ending with packet reception or vice versa. The header control circuit 52 makes a packet that includes a header with packet identification information but no data field and controls transmission of the packet. The data field control circuit 53 makes a packet that includes not only a header with packet identification information but also a data field and controls transmission of the packet. And the data processing circuit 54 processes and controls the data field of the received packet.

FIGS. 3 through 7 illustrate formats of packets of various types to be received by way of the bus B1. Specifically, FIGS. 3 through 7 illustrate the formats of BWRQ (block write request), QWRQ (quadlet write request), WRS (write response), BRRQ (block read request) and BRRS (block read response) packets, respectively.

It should be noted that packets of various types to be output onto the bus B1 also have the same formats as those illustrated in FIGS. 3 through 7.

FIGS. 8 through 12 illustrate formats of packets of various types to be written on the link core circuit 14. That is to say, each of the transmission buffer 17, transmission/reception buffer 16 and packet processing controller 20 shown in FIG. 1 writes a packet on the link core circuit 14 in any of the formats shown in FIGS. 8 through 12. The formats illustrated in FIGS. 3 through 7 correspond to those illustrated in FIGS. 8 through 12, respectively.

In outputting a packet onto the bus B1, the link core circuit 14 computes error check codes such as header_CRC and data_CRC and adds fields, representing the computation results, to the packet having the format shown in FIG. 8, 9, 10, 11 or 12. In this manner, the link core circuit 14 makes a packet in any of the formats shown in FIGS. 8 through 12.

Where the link core circuit 14 has received a packet through the bus B1, the circuit 14 detects errors from the packet using cyclic redundancy codes (CRCs) by reference to the header_CRC and/or data_CRC field(s) included in any of the formats shown in FIGS. 8 through 12.

Packet Communications System

Next, a packet communications system, including packet transmission/reception processors with the configuration shown in FIG. 1, will be described.

Figure 13:
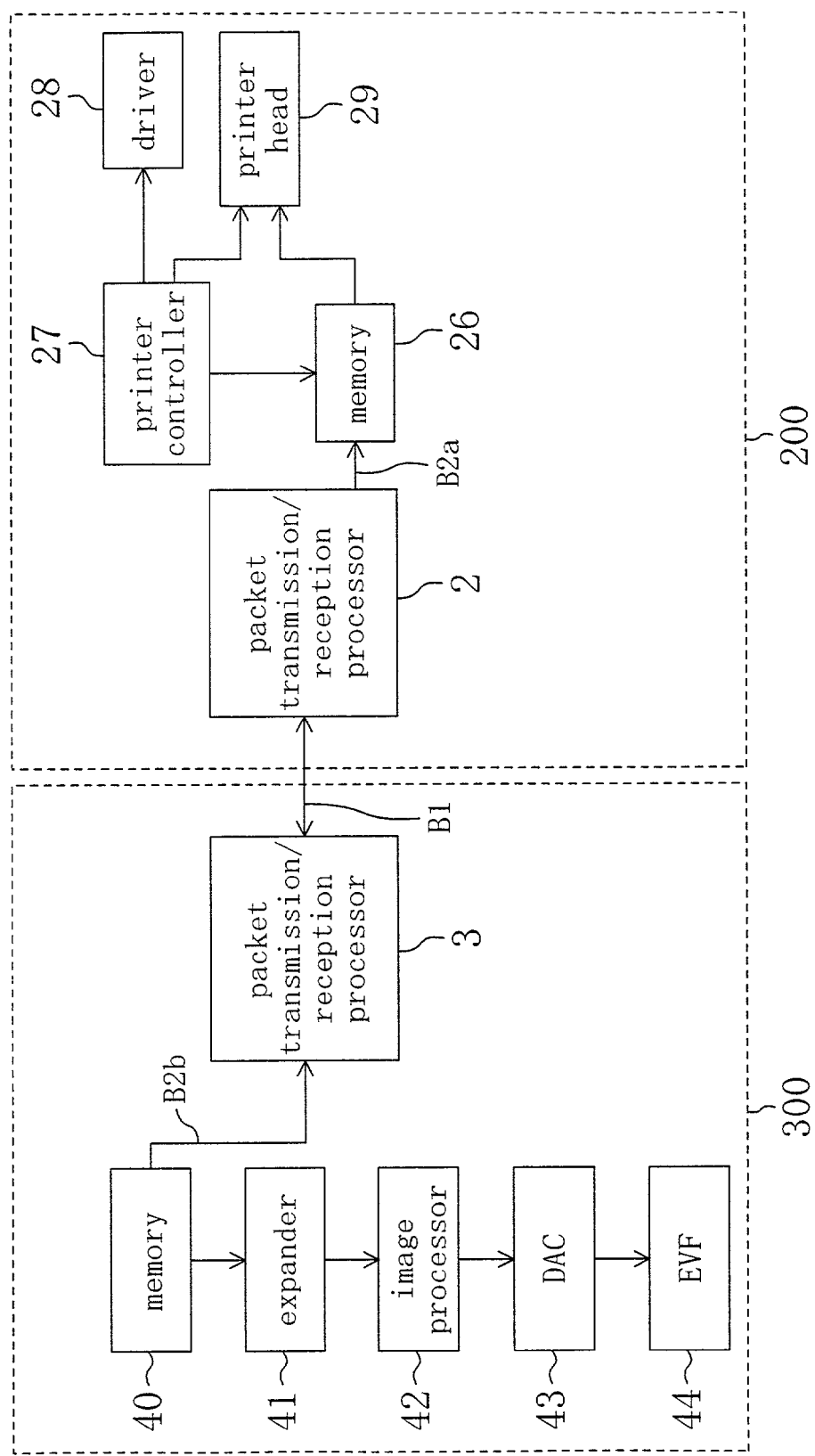
FIG. 13 is a block diagram illustrating an arrangement for a packet communications system including packet transmission/reception processors with the configuration shown in FIG. 1.
Figure 14:
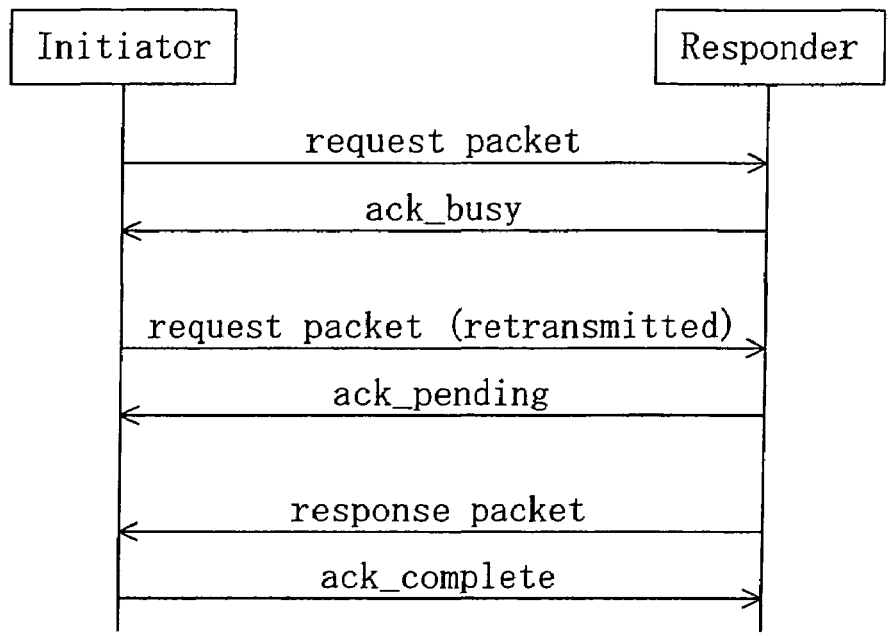
FIG. 14 illustrates an asynchronous transaction in compliance with the IEEE 1394.
Figure 15:
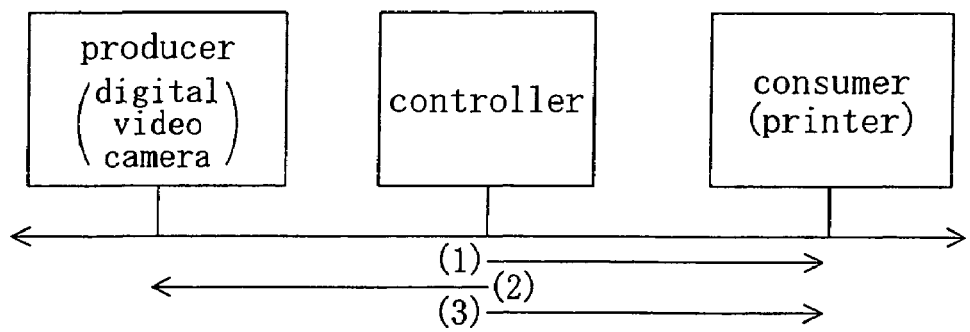
FIG. 15 illustrates a configuration for an asynchronous connection system.
Figure 16:
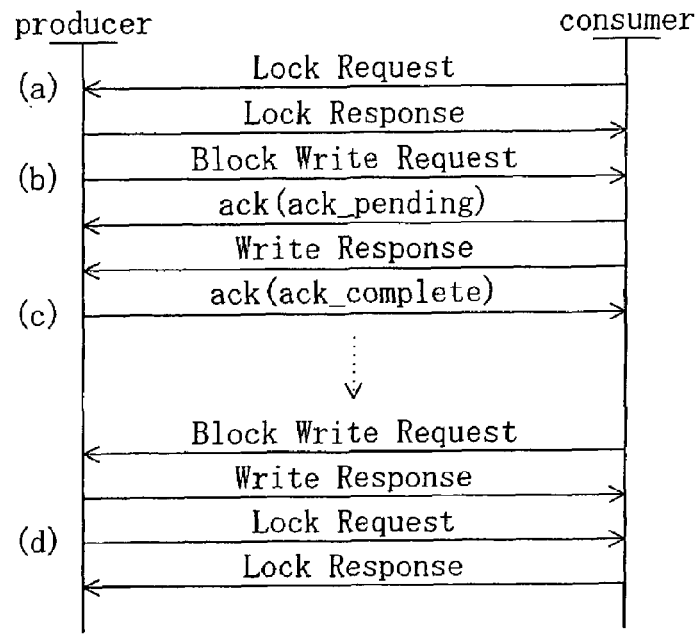
FIGS. 16 and 17 illustrate transactions in accordance with the asynchronous connection protocol.
Figure 17:
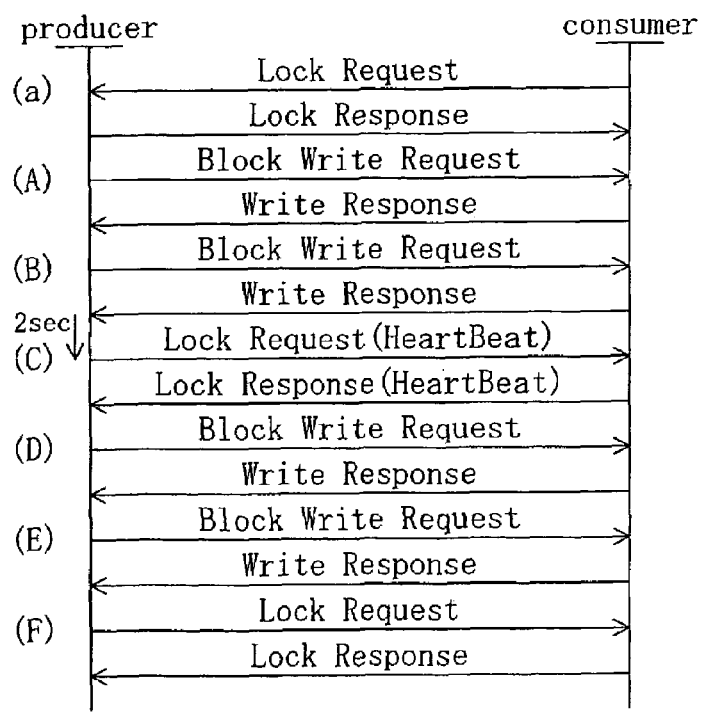
Figure 18:
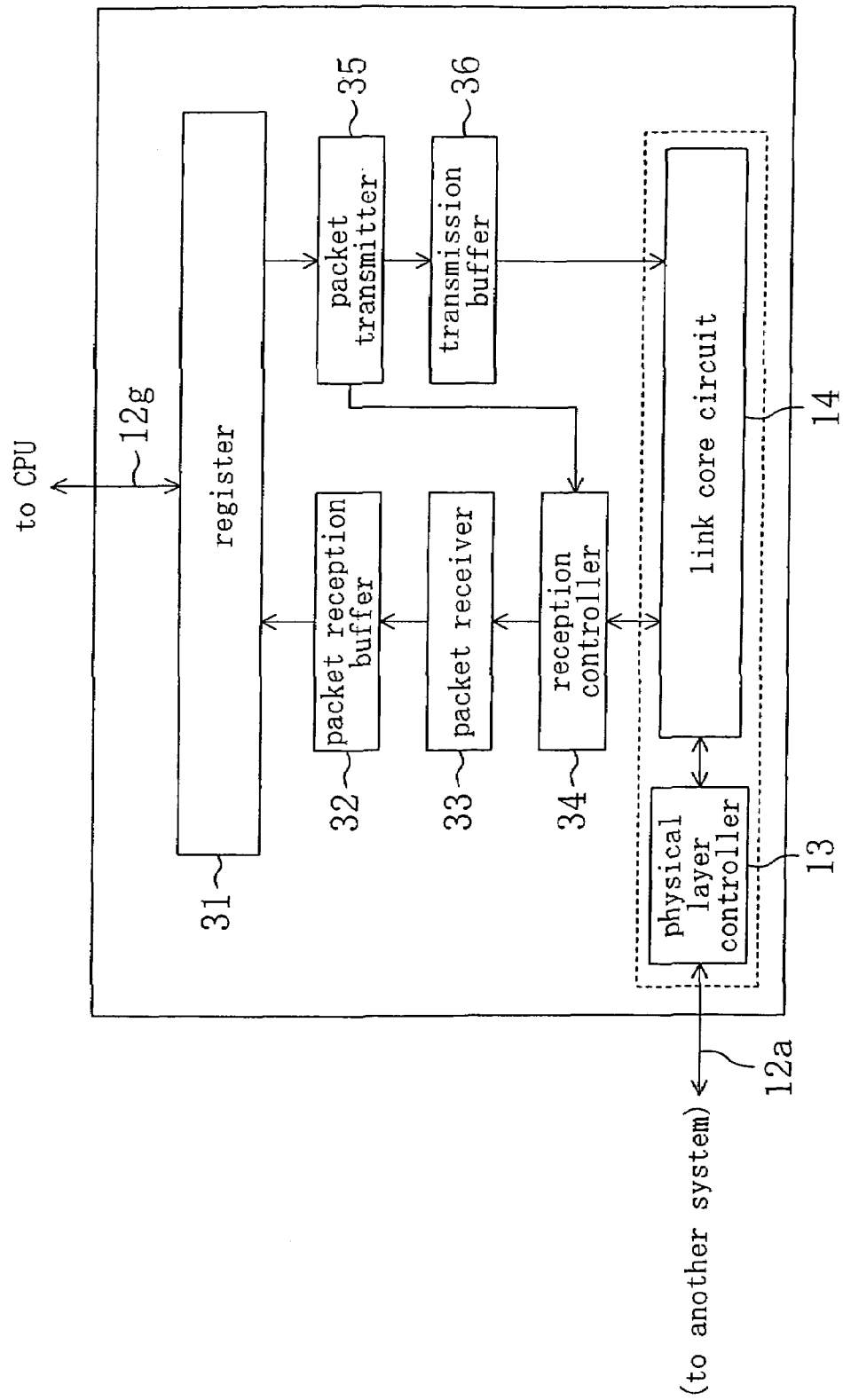
FIG. 18 is a block diagram illustrating a configuration for a known packet transmission/reception processor.

FIG. 13 is a block diagram illustrating an arrangement for a packet communications system including packet transmission/reception processors with the configuration shown in FIG. 1. As shown in FIG. 13, the system includes a digital video camera (DVC) 300 as the producer node and a printer 200 as the consumer node.

The DVC 300 includes packet transmission/reception processor 3, memory 40, expander 41, image processor 42, digital-to-analog converter (DAC) 43 and electric viewfinder (EVF) 44.

The processor 3 has the same configuration as the counterpart shown in FIG. 1. The image data, captured by the DVC 300, is compressed by a predetermined high-efficiency encoding method and the compressed data is stored on the memory 40. The expander 41 expands (or decompresses) the compressed image data that has been read out from the memory 40. The image processor 42 subjects the image data, supplied from the expander 41, to image processing required for presenting the data on the EVF 44. The DAC 43 converts the image data, processed by the image processor 42, into analog image data. And the analog image data, supplied from the DAC 43, is presented as a video on the EVF 44.

The data stored on the memory 40 is either presented on the EVF 44 or transferred to the printer 200 by way of the processor 3 and bus B1. In presenting the data on the EVF 44, the compressed image data is expanded by the expander 41, processed by the image processor 42 so that the data can be presented on the EVF 44, and then presented on the EVF 44 by way of the DAC 43.

The printer 200 includes packet transmission/reception processor 2, memory 26, printer controller 27, driver 28 and printer head 29.

The processor 2 has the same configuration as the counterpart shown in FIG. 1. The output data of the processor 2 is stored on the memory 26. The printer controller 27 controls the storage of the output data of the processor 2 onto the memory 26. The printer controller 27 also controls the printer head 29 and driver 28 in such a manner that the image data stored on the memory 26 is printed as intended.

In transferring data in accordance with the IEEE 1394, the maximum payload size of a packet is defined by the transfer rate of the packet. Accordingly, the maximum data field size of a packet is also defined by the transfer rate of the packet. In the illustrated embodiment, the transfer rate of a packet is S400 (=400 Mbps) and the data length transferable per packet is 2048 bytes.

Hereinafter, it will be described how the packet communications system with such an arrangement operates. In the following illustrative example, 8 KB data is transferred from the DVC 300 to the printer 200. This operation changes depending on whether or not time-out occurs and where the timeout occurred. Accordingly, for convenience sake, the operation of the system will be described for the three possible situations: where no time-out occurred; where a time-out occurred at the consumer node (i.e., at the printer 200); and where a time-out occurred at the producer node (at the DVC 300).

(1) No Time-Out Occurred

First, to make a BWRQ packet at the producer node (i.e., at the DVC 300), 2 KB data is supplied from the memory 40 to the packet processing controller 20 (see FIG. 1) in the packet transmission/reception processor 3. In response, the controller 20 makes a BWRQ packet including the data read out. This packet is passed to the transmission/reception buffer 16, link core circuit 14 and physical layer controller 13 and then transmitted through the bus B1 (see FIG. 1 also).

Next, the BWRQ packet is received at the consumer node (i.e., the printer 200) by way of the bus B1. Then, the packet is input to the packet filter circuit 15 in the processor 2 via the physical layer controller 13 and link core circuit 14 (see FIG. 1, too).

As shown in FIG. 1, the filter circuit 15 refers to the values of the tcode, source_ID and segment buffer address variables 21b, 21d and 21e stored on the register 21. Then, by comparing the values in the tcode, source_ID and destination_offset regions included in the BWRQ packet received to those of the tcode, source_ID and segment buffer address variables 21b, 21d and 21e stored on the register 21, the filter circuit 15 determines whether or not the BWRQ packet received has anything to do with the data transfer sequence currently executed. If the answer is YES, the filter circuit 15 stores the BWRQ packet on the transmission/reception buffer 16 and outputs the control signal CT1 to the packet processing controller 20. Otherwise, the filter circuit 15 stores the BWRQ packet on the packet reception buffer 18. In the illustrated example, the BWRQ packet is stored on the transmission/reception buffer 16. Depending on the packet to be stored, the segment buffer address variable 21e is updated in the register 21.

In response to the control signal CT1 supplied from the filter circuit 15, the controller 20 sets the value of the Ack control variable 21a to "ack_busy" in the register 21. After that, by reference to the value "ack_busy" of the Ack control variable 21a, the link core circuit 14 stops receiving other packets through the bus B1 but returns an ack packet having the value "ack_busy" in response to the packet.

The filter circuit 15 inputs the BWRQ packet received to the controller 20 by way of the transmission/reception buffer 16. The data included in the packet is processed by the controller 20 and then stored on the memory 26 by way of the bus B2a as shown in FIG. 13.

After getting the data stored on the memory 26, the controller 20 refers to the source_ID and t1 variables 21d and 21c in the register 21, thereby generating header and data for a WRS packet. As shown in FIG. 1, the WRS packet is input to the transmission filter 19. Next, the WRS packet is passed from the transmission filter 19 to the transmission buffer 17, link core circuit 14 and physical layer controller 13 and then sent out through the bus B1 as shown in FIG. 1.

Subsequently, the WRS packet is received at the producer node (i.e., the DVC 300) by way of the bus B1. Then, the WRS packet is input to the filter circuit 15 in the processor 3 via the physical layer controller 13 and link core circuit 14 as shown in FIG. 1.

As shown in FIG. 1, the filter circuit 15 refers to the values of tcode and t1 variables 21b and 21c stored on the register 21. Then, by comparing the values in the tcode and t1 regions included in the WRS packet received to those of the tcode and t1 variables 21b and 21c stored on the register 21, the filter circuit 15 determines whether or not the WRS packet received has anything to do with the data transfer sequence currently executed. If the answer is YES, the filter circuit 15 outputs the control signal CT1 to the controller 20. Otherwise, the filter circuit 15 stores the packet on the packet reception buffer 18.

Then, the controller 20 makes an ack packet having a value "ack_complete" in response to the WRS packet and sends the ack packet out through the bus B1.

Next, when the ack packet is received at the consumer node (i.e., the printer 200), the filter circuit 15 in the processor 2 analyzes the contents of the ack packet received through the bus B1. Then, the filter circuit 15 outputs the analysis result to the register 21 and the control signal CT1 to the controller 20 as shown in FIG. 1. In response to this control signal CT1, the controller 20 removes the value of the Ack control variable 21a from the register 21 so that the processor 2 can start receiving packets again. That is to say, responsive to the control signal CT1, the controller 20 ends the current transaction and starts the next transaction.

Then, the producer node (i.e., the DVC 300) makes and transmits another BWRQ packet to start the next transaction.

By performing the same transaction four times, the 8 KB data is completely transferred to the consumer node, or the printer 200.

As can be seen, in this packet communications system using the packet transmission/reception processors, the CPU has nothing to do with the transaction management. That is to say, the load on the CPU about the transaction processing can be lightened. This greatly contributes to realizing high-speed data transfer in compliance with the IEEE 1394.

In addition, the packet filter circuit 15 filters out the packets having nothing to do with the current data transfer sequence. Accordingly, the execution of a data transfer process is not interrupted. That is to say, there is no need to perform extra controls like branching to another transaction while executing a data transfer process, and the packet processing controller 20 may perform a simplified control. As a result, the packet transmission/reception processor 1, 2 or 3 can have a simpler configuration.

(2) Time-Out Occurred at Consumer Node (Printer 200)

In this example, a time-out of 100 ms is set for the producer node (i.e., the DVC 300). On the other hand, a time-out of 90 ms is set for the timer 22 in the processor 2 at the consumer node (i.e., the printer 200).

When a data transfer process is started, 2 KB data is supplied from the memory 40 to the controller 20 (see FIG. 1) in the processor 3 to make a BWRQ packet at the producer node (i.e., at the DVC 300). In response, the controller 20 makes a BWRQ packet including the data read out. This BWRQ packet is passed to the transmission/reception buffer 16, link core circuit 14 and physical layer controller 13 and then sent out through the bus B1 (see FIG. 1 also).

Next, the BWRQ packet is received at the consumer node (i.e., the printer 200) by way of the bus B1. Then, the packet is input to the filter circuit 15 in the processor 2 via the physical layer controller 13 and link core circuit 14 (see FIG. 1, too). In response to the control signal CT1 supplied from the filter circuit 15, the controller 20 sets the value of the Ack control variable 21a to "ack_busy" in the register 21. Also, in response to the control signal CT1, the controller 20 outputs a control signal CT2b to the timer 22. This control signal CT2b starts the timer 22, which starts clocking. The filter circuit 15 outputs the BWRQ packet received to the controller 20 by way of the transmission/reception buffer 16. The data included in the packet is processed by the controller 20, and then stored on the memory 26 by way of the bus B2a as shown in FIG. 13.

In this case, if the controller 20 has failed to process the received packet within 90 ms, the timer 22 detects a timeout and informs the CPU of that. In response, the CPU issues a packet processing suspend instruction and packet transmit instruction for the controller 20 by way of the register 21 as shown in FIG. 1.

In accordance with the packet processing suspend instruction received from the CPU, the controller 20 suspends the current packet processing. Also, in accordance with the transmit instruction, the controller 20 generates header and data for a WRS packet with the processing of the received packet still suspended. The WRS packet produced is passed from the controller 20 to the transmission filter 19, transmission buffer 17, link core circuit 14 and physical layer controller 13 and then transmitted through the bus B1.

Subsequently, the WRS packet is received at the producer node (i.e., the DVC 300) by way of the bus B1. Then, the WRS packet is input to the filter circuit 15 in the processor 3 via the physical layer controller 13 and link core circuit 14 as shown in FIG. 1. Then, the controller 20 makes an ack packet having a value "ack_complete" in response to the WRS packet and sends the ack packet out through the bus B1.

Next, the CPU sends a packet processing restart instruction to the controller 20 at the consumer node (i.e., the printer 200). In accordance with this instruction, the packet processing suspended is started again. Specifically, the filter circuit 15 in the processor 2 analyzes the contents of the ack packet received. And the filter circuit 15 outputs the analysis result to the register 21 and the control signal CT1 to the controller 20 as shown in FIG. 1. In response to this control signal CT1, the controller 20 ends the current transaction and restarts executing the received packet processing suspended.

Then, the producer node (i.e., the DVC 300) receives a WRS packet and starts the next transaction. However, while re-executing the packet processing, the consumer node (i.e., printer 200) sets the value of the Ack control variable 21a in the register 21 to "ack_busy" so as not to accept request packets transmitted from the producer node. And when the received packet has been re-processed, the controller 20 removes the value of the Ack control variable 21a from the register 21 so as to accept request packets again. The consumer node, or the printer 200, restarts receiving request packets at this point in time. And by performing three more transactions, the 8 KB data is completely stored on the memory 26 and the transfer process ends.

As can be seen, this packet transmission/reception processor can process packets without causing a time-out at the producer node (i.e., DVC 300). Accordingly, there is no need to control multiple transactions concurrently and the packet processing controller 20 and the processing sequence can be simplified.

(3) Time-Out Occurred at Producer Node (DVC 300)

In this example, a time-out of 2 sec is set for the timer 22 at the DVC 300.

First, 2 KB data is supplied from the memory 40 to the controller 20 (see FIG. 1) in the processor 3 to make a BWRQ packet at the producer node (i.e., the DVC 300). In response, the controller 20 starts to make a BWRQ packet to be transmitted and outputs a control signal CT2b to the timer 22. This control signal CT2b makes the timer 22 start clocking.

If the BWRQ packet is not transmitted even after 2 sec has passed since the controller 20 started to make the BWRQ packet, the timer 22 detects a time-out and informs the CPU of that. Also, the timer 22 outputs a control signal CT2a to the controller 20. In response to this control signal CT2a, the controller 20 stops making the BWRQ packet.

Since the preset time (2 sec) has passed, the CPU performs heartbeat processing. After having finished the heartbeat processing, the CPU sets values in predetermined fields in the register 21. In response, the controller 20 restarts making the BWRQ packet.

When the BWRQ packet is made by the controller 20, the packet is passed to the transmission/reception buffer 16, link core circuit 14 and physical layer controller 13 and then transmitted through the bus B1 (see FIG. 1 also).

Next, the BWRQ packet is received at the consumer node (i.e., the printer 200) by way of the bus B1. Then, the packet is input to the filter circuit 15 in the processor 2 via the physical layer controller 13 and link core circuit 14 (see FIG. 1, too).

In response to the control signal CT1 supplied from the filter circuit 15, the controller 20 sets the value of the Ack control variable 21a to "ack_busy" in the register 21. The filter circuit 15 outputs the BWRQ packet received to the controller 20 by way of the transmission/reception buffer 16. The data included in the packet is processed by the controller 20 and then stored on the memory 26 through the bus B2a as shown in FIG. 13. After getting the data stored on the memory 26, the controller 20 generates header and data for a WRS packet. The WRS packet produced is passed from the controller 20 to the transmission filter 19, transmission buffer 17, link core circuit 14 and physical layer controller 13 and then transmitted through the bus B1.

Subsequently, the WRS packet is received at the producer node (i.e., the DVC 300) by way of the bus B1. Then, the WRS packet is input to the filter circuit 15 in the processor 3 via the physical layer controller 13 and link core circuit 14 as shown in FIG. 1. Then, the controller 20 makes an ack packet having a value "ack_complete" in response to the WRS packet and sends the ack packet out through the bus B1.

Next, the filter circuit 15 in the processor 2 at the consumer node (i.e., printer 200) analyzes the contents of the ack packet received. And the filter circuit 15 outputs the analysis result to the register 21 and the control signal CT1 to the controller 20 as shown in FIG. 1. In response to this control signal CT1, the controller 20 removes the value of the Ack control variable 21a from the register 21 so that the processor 2 can start receiving packets again. That is to say, responsive to the control signal CT1, the controller 20 ends the current transaction and starts the next transaction.

Then, the producer node (i.e., the DVC 300) makes and transmits another BWRQ packet to start the next transaction.

By performing the same transaction four times, the 8 KB data is completely transferred to the consumer node, or the printer 200.

As can be seen, this packet transmission/reception processor manages time passed since packet making was started, thereby performing, suspending or restarting the packet making arbitrarily. Accordingly, while performing a transaction, this processor can perform another transaction (e.g., heartbeat processing) at any time required.

What is claimed is:

1. A packet transmission/reception processor coupled to a CPU, the processor comprising:
   a link core circuit for receiving a packet externally delivered through a bus;

a packet processing controller for processing the packet received by the link core circuit, generating a packet to be transmitted in response to the received packet, and supplying the packet to be transmitted to the link core circuit; and a packet processing control timer for clocking how much time has passed since the packet was received by the link core circuit and for generating a signal when the time passed reaches a predetermined amount of time, wherein the link core circuit sends out the packet to be transmitted, supplied from the packet processing controller, by way of the bus, and responsive to the signal supplied from the packet processing control timer, the packet processing controller stops processing the received packet, generates another packet to be transmitted in response to the received packet and restarts processing the received packet.

2. The processor of claim 1, wherein while processing the received packet, the controller prohibits the link core circuit from receiving another packet delivered externally through the bus.

3. The processor of claim 1, further comprising a packet filter circuit for determining, by identification information included in each of the packets received by the link core circuit, whether or not each said received packet should be processed and for supplying only the received packets to be processed to the controller.

4. The processor of claim 3, wherein in accordance with the identification information of each said received packet and based on a result of the processing that the controller has performed on the received packet, the filter circuit predicts header information of a packet that the link core circuit should receive next time; compares the predicted header information to header information of a next packet that the link core circuit has actually received; determines, based on a result of the comparison, whether or not the next packet received by the link core circuit should be stored; and then supplies only the packets to be stored to the controller.

5. The processor of claim 1, wherein the controller comprises:

a transaction control circuit for controlling a series of transactions, each starting with packet transmission and ending with packet reception or vice versa;

a packet engine circuit for automatically dividing a packet and controlling all the transactions;

a header control circuit for making a packet that includes a header with packet identification information but no data field and for controlling transmission of the packet;

a data field control circuit for making a packet that includes not only a header with packet identification information but also a data field and for controlling transmission of the packet; and a data processing circuit for processing and controlling the data field of the received packets.

6. The processor of claim 5, wherein the transaction control circuit manages a time it takes to transmit a packet after the controller started to make the packet or to finish processing a received packet after the controller received the packet, outputs a result of the time management to the CPU and also manages a time it takes for the CPU to transmit a packet after the CPU started to make the packet or to finish processing a received packet after the CPU received the packet.

7. A packet transmission/reception processor coupled to a CPU, the processor comprising:

a packet processing controller for making a packet to be transmitted;

a link core circuit for sending out the packet to be transmitted, which has been made by the controller, to an external unit by way of a bus; and a packet processing control timer for clocking how much time has passed since the packet processing controller starts to generate the packet to be transmitted and for generating a signal when the packet to be transmitted is not sent out after the time passed reaches a predetermined amount of time, wherein the packet processing controller stops generating the packet to be transmitted in response to the signal supplied from the packet processing control timer and restarts generating the packet to be transmitted when a transaction processing performed by the CPU is completed.

8. The processor of claim 7, wherein the controller comprises:

a transaction control circuit for controlling a series of transactions, each starting with packet transmission and ending with packet reception or vise versa;

a packet engine circuit for automatically dividing a packet and controlling all the transactions;

a header control circuit for making a packet that includes a header with packet identification information but no data field and controlling transmission of the packet;

a data field control circuit for making a packet that includes not only a header with packet identification information but also a data field and for controlling transmission of the packet; and a data processing circuit for processing and controlling the data field of the received packets.

9. The process of claim 8, wherein the transaction control circuit manages a time it takes to transmit a packet after the controller started to generate the packet or to finish processing a received packet after the controller received the packet, outputs a result of the time management to the CPU and also manages a time it takes for the CPU to transmit a packet after the CPU started to generate the packet or to finish processing a received packet after the CPU received the packet.

10. A packet transmission/reception processor coupled to a CPU, the processor comprising:

a link core circuit for receiving a packet externally delivered through a bus; and a packet processing controller for processing the packet received by the link core circuit, generating a packet to be transmitted in response to the received packet, and supplying the packet to be transmitted to the link core circuit, wherein the link core circuit sends out the packet to be transmitted, supplied from the packet processing controller, by way of the bus, and while processing the received packet, the controller prohibits the link core circuit from receiving another packet delivered externally through the bus.

11. The processor of claim 10, further comprising a packet filter circuit for determining, by identification information included in each of the packets received by the link core circuit, whether or not each said received packet should be processed and for supplying only the received packets to be processed to the controller.

12. The processor of claim 11, wherein in accordance with the identification information of each received packet and based on a result of the processing that the controller has performed on the received packet, the filter circuit predicts header information of a packet that the link core circuit should receive next time; compares the predicted header information of a next packet that the link core circuit has actually received; determines, based on a result of the comparison, whether or not the next packet received by the link core circuit should be stored; and then supplies only the packets to be stored to the controller.

13. The processor of claim 10, wherein the controller comprises:

a transaction control circuit for controlling a series of transactions, each starting with packet transmission and ending with packet reception or vise versa;

a packet engine circuit for automatically dividing a packet and controlling all the transactions;

a header control circuit for making a packet that includes a header with packet identification information but no data field and for controlling transmission of the packet;

a data field control circuit for making a packet that includes not only a header with a packet identification information but also a data field and for controlling transmission of the packet; and a data processing circuit for processing and controlling the data field of the received packets.

14. The processor of claim 13, wherein the transaction control circuit manages a time it takes to transmit a packet after the controller started to generate the packet or to finish processing a received packet after the controller received the packet, outputs a result of the time management to the CPU and also manages a time it takes for the CPU to transmit a packet after the CPU started to generate the packet or to finish processing a received packet after the CPU received the packet.

* * * * *